Jan. 19, 1932.     C. L. STOKES     1,841,687
AUTOMATIC FUEL REGULATOR
Filed Sept. 1, 1927     2 Sheets-Sheet 1
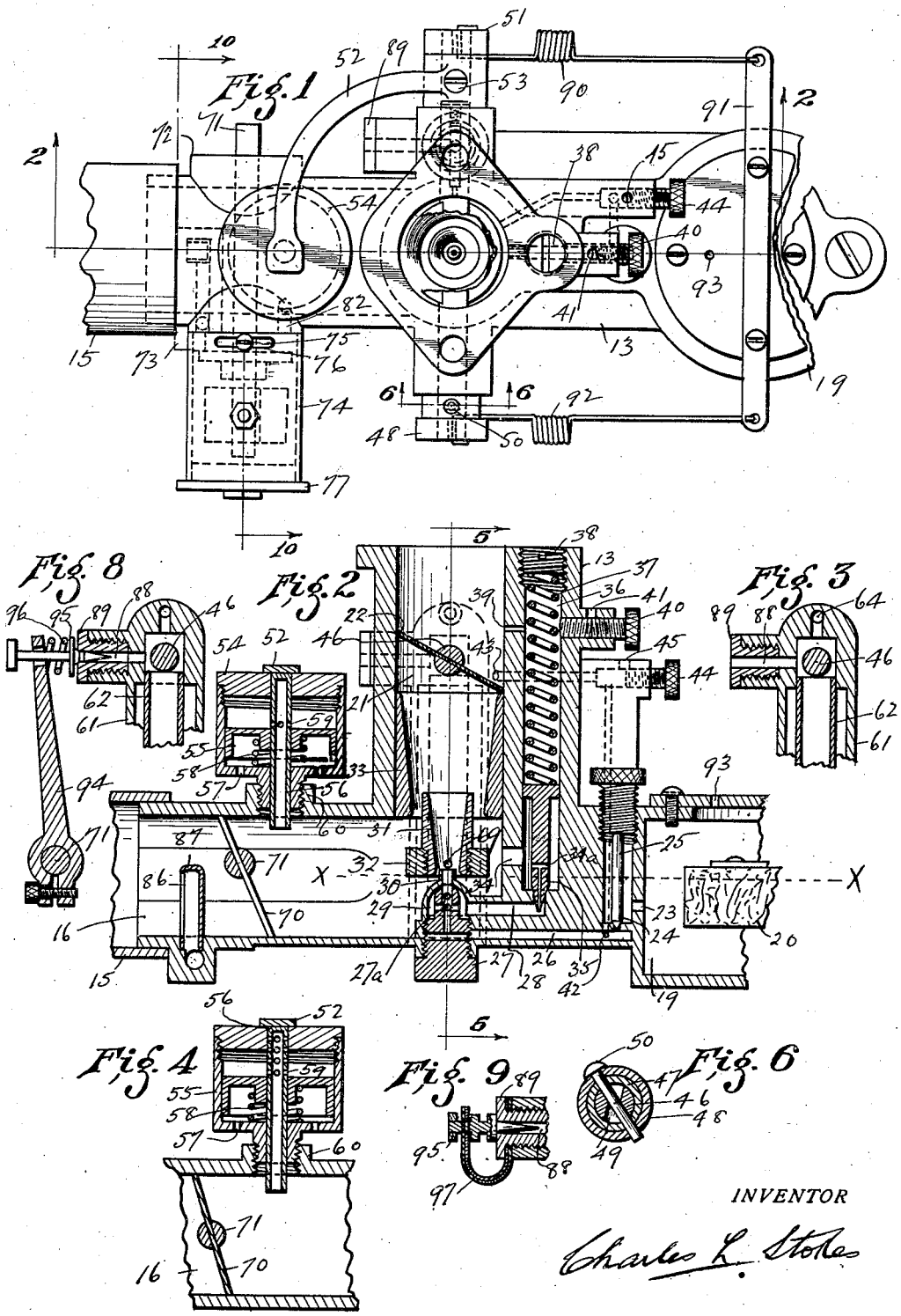
INVENTOR
Charles L. Stokes

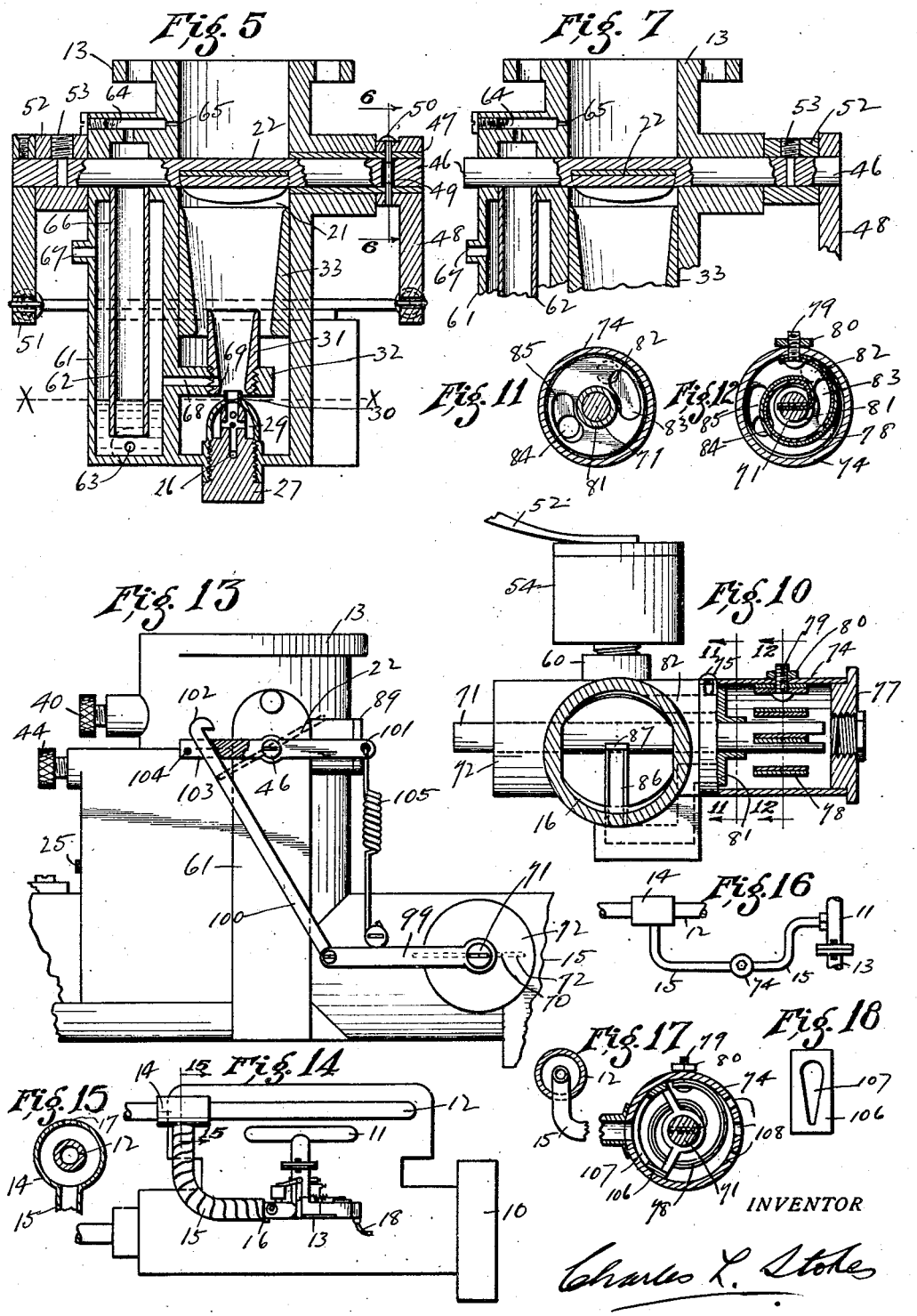

Patented Jan. 19, 1932

1,841,687

UNITED STATES PATENT OFFICE

CHARLES LAWRENCE STOKES, OF LOS ANGELES, CALIFORNIA, ASSIGNOR TO CURTIS B. CAMP, TRUSTEE, OF GLENCOE, ILLINOIS

AUTOMATIC FUEL REGULATOR   REISSUED

Application filed September 1, 1927. Serial No. 216,918.

This invention relates to improvements in automatic fuel regulation for internal combustion engines.

The principal object of the invention is to provide automatic control of the fuel supply from a carbureter to an internal combustion engine to which the carbureter is attached.

Another object of the invention is to provide automatic fuel regulation through a carbureter to an engine controlled by the heat of the engine.

Another object is to provide automatically controlled choking and/or priming means for a carbureter.

Another object is to provide automatic control of the main throttle valve of a carbureter at starting.

Another object is to provide a thermostatically controlled carbureter for an internal combustion engine.

Another object is to provide a theromstatically controlled means of regulating the supply of fuel and air to an engine.

Other objects will become apparent as my invention is more fully disclosed herein.

Referring to the drawings, wherein the same numbers indicate like parts:—

Fig. 1 is a plan view of a carbureter.

Fig. 2 is a section along the lines 2—2 of Fig. 1.

Fig. 3 is a section of part of Fig. 2.

Fig. 4 is a modification of part of Fig. 2.

Fig. 5 is a section along the lines 5—5 of Fig. 2.

Fig. 6 is a section along the lines 6—6 of Fig. 5.

Fig. 7 is an alternative for part of Fig. 5.

Fig. 8 is a detail of improved construction for application to Figs. 1, 2, 5, and 7.

Fig. 9 is an alternative for Fig. 8.

Fig. 10 is a section along the lines 10—10 of Fig. 1.

Fig. 11 is a view along the lines 11—11 of Fig. 10.

Fig. 12 is a view along the lines 12—12 of Fig. 10.

Fig. 13 is a side view of a modification of Fig. 1.

Fig. 14 is a view of the carbureter attached to an internal combustion engine.

Fig. 15 is a section along the lines 15—15 of Fig. 14.

Fig. 16 is an alternative to part of Fig. 14.

Fig. 17 is an alternative to part of Fig. 14.

Fig. 18 is a view of part of Fig. 17.

An internal combustion engine 10 is provided with an inlet manifold 11 and an exhaust pipe 12. A carbureter 13 is fixed to manifold 11 for supplying air and fuel in regulated and variable quantities to engine 10 responsive to the engine suction and a hot air stove 14 surrounds pipe 12 being connected by a flexible pipe 15 to the main air entry 16 of carbureter 13, air being admitted to the interior of stove through a port 17. Liquid fuel is supplied in any well known manner to carbureter 13 through a pipe 18, all as illustrated in Figs. 14 and 15.

Referring now to Figs. 1, 2, 3, 5, 6, 10, 11 and 12, carbureter 13 is provided with the usual constant level float chamber 19 which receives liquid fuel through pipe 18, the level of which is controlled by float 20 to which is attached a valve (not shown) governing the entry of pipe 18 to chamber 19.

Carbureter 13 is attached to engine 10 and the engine suction draws air in through main air entry 16 to a mixing chamber 21 where fuel is mixed therewith and supplied to engine 10 in regulated and variable quantities by a throttle valve 22. The main liquid fuel supply is drawn from chamber 19 through a port 23 to a regulating port 24 controlled by a needle valve 25 and thence through a passage 26 to a fitting 27 where it is mixed with a secondary air supply drawn through a passage 28 to a secondary mixing chamber 29 and discharged through main nozzle 30 to the main mixing chamber 21.

The discharge of nozzle 30 is set at the throat of a small Venturi tube 31, held in carbureter 13 by a part 32, and the discharge of venturi 31 is set at the throat of a large Venturi tube 33 the upper part of which forms the lower part of mixing chamber 21. Secondary air is supplied to passage 28 from air entry 16 through a port 34, the flow therethrough being governed by a valve 35 working in a cylinder 36. Valve 35 is normally seated by spring 37 held in passage 36 by a plug 38 and is lifted from its seat by the engine suction applied to cylinder 36 through a port 39 on the engine side of throttle 22 and this suction can be regulated by a screw 40 controlling the entry of air through a port 41 in the form of an air bleed.

The usual idling mixture is provided by the supply of liquid fuel from passage 26 through a passage 42 which leads to a discharge orifice 43 in the mixing chamber on the engine side of throttle 22, the admission of idling air being regulated by an adjusting screw 44 controlling the admission of air through a port 45, and the idling mixture is supplied only at such times as throttle 22 is substantially closed or as hereinafter described.

Throttle 22 is held in a spindle 46 which is journalled in the walls of carbureter 13, one end being surrounded by a sleeve 47 on which is pressed a throttle arm 48. A slot 49 is formed in spindle 46 to permit a certain degree of movement thereof with respect to throttle arm 48 and a pin 50 passes through arm 48, sleeve 47 and spindle 46 for transmitting motion from arm 48 to spindle 46, there being no lost motion between pin 50, arm 48 and sleeve 47.

To the opposite end of spindle 46 is attached a secondary throttle arm 51, whereby a limited movement of spindle 46 and throttle 22 with respect to arm 48 may be effected at starting periods, the movement depending on the angularity in the walls of slot 49, and a starting lever 52 fastened by screw 53 to effect said movement initially.

The other end of lever 52 rests on the upper part of a dashpot 54 containing a reciprocating piston 55 pressed on a stem 56. The lower part of dashpot 54 is open to atmosphere through a port 57 and the under side of piston 55 is cushioned against a spring 58. Stem 56 is hollow and a plurality of ports 59 through the walls thereof connect the space between the upper side of piston 55 and the upper wall of dashpot 54 with air passage 16; dashpot 54 being threaded at its lower end to screw into a boss 60.

This last end of spindle 46 passes through the upper part of an accelerating well 61 containing a tube 62 open at its lower end to receive liquid fuel through a passage 63 from chamber 19 and its upper end connecting with a passage 64, and a minute orifice 65, to mixing chamber 21 on the engine side of throttle 22. Tube 62 is fixed at its upper end in the casting to have an annular space 66 therearound connected to atmosphere by a port 67 and through a passage 68 in part 32 to a discharge orifice 69 in venturi 31, it being here noted that port 67, passage 68, orifice 69, nozzle 30 and air port 34 are all above the normal constant liquid level X—X in float chamber 19.

A choke valve 70 is mounted off center in passage 16 on a spindle 71 having its ends journalled in bosses 72 and 73. Boss 73 is encircled by a casing 74 adjustably held thereon by a screw 75 working in a slot 76 and having its outer end closed by a cover 77. Interiorly of casing 74 is a bimetallic thermostatic spring 78 having one end affixed in a slot in spindle 71, the other end being fastened to casing 74 by bolt 79 and nut 80. A regulating disk 81, fixed to spindle 71, serves to open and close a passage 82 connecting the interior of casing 74 with passage 16 through boss 73 on the engine side of choke valve 70, the opening and closing being effected by the relative position of a slot 83 cut in disk 81. A second passage 84 serves to connect the interior of casing 74 with air passage 16 on the atmosphere side of choke valve 70 being continuously open by means of a slot 85 cut in disk 81, its other end terminating in an impact pipe 87 having its atmosphere side cut away at 86 and standing to such a height in passage 16 as to form a stop for choke valve 70 when wide open and in a horizontal position. The upper part of accelerating well 61 has passage 64 therein connected to atmosphere through passage 88 closed by a plug 89 having an orifice of predetermined size therein to regulate the height to which liquid fuel will be drawn in pipe 62.

When optimum operating temperature for engine 10 has been reached and choke valve 70 is substantially unrestrictedly open, throttle 22 is held closed at idling position by a spring 90 fastened to one end of a cross bar 91 extending across the cover of float chamber 19, a second spring 92 fastened to the opposite end of bar 91 serving to apply the proper tension to arm 48 for holding throttle 22 at idling position. Float chamber 19 is open to atmospheric pressure through a port 93.

The operation of the devices already illustrated and described when attached in operative position to an internal combustion engine is as follows:—

If it be assumed that engine 10 is cold and at low temperature thermostatic spring 78 will be contracted to hold choke valve 70 closed in passage 16 except for a very slight leak around the periphery of valve 70. Throttle 22 is held closed at idling position. Upon cranking engine 10, the suction thereof is transmitted past throttle 22 through stem 56 and holes 59 to the upper part of piston 55 whereby the same is raised thereby lifting lever 52 and opening throttle 22 a predetermined amount against the resistance of spring 90. The amount of opening of throttle 22 will be determined by the degree of angularity of the walls of slot 49 in spindle 46. In this manner a comparatively high suction is applied to nozzle 30 for drawing therethrough a rich priming charge of liquid fuel which is unmixed with air in fitting 27 because substantially the same vacuum exists at nozzle 30 as there is at port 34 when choke valve 70 is closed. At the same time a limited amount of air and liquid fuel is supplied through orifice 43. This rich priming charge, which is due to the limited amount of air passing choke valve 70, is drawn into the cylinders of engine 10 by its suction until the mixture is ignited therein, whereupon a sudden increase in vacuum takes place in mixing chamber 21 because engine 10 will be then idling at increased idling speed over cranking speed and this increase in vacuum causes a partial opening of choke valve 70 against the resistance of thermostatic spring 78 because of the difference in pressure now exerted on opposite sides of valve 70, valve 70 being mounted on spindle 71 off center in passage 16.

Throttle 22 being held open beyond normal idling position a predetermined amount by lever 52, engine 10 runs at a fast rate because it is necessary to idle fast at low temperatures and the engine vacuum is applied through passage 82 to the interior of casing 74 whereby heated air is drawn thereto from stove 14 through pipe 15, pipe 87 and passage 84, it being noted that at cranking speeds passage 82 is entirely closed by disk 83 so that the highest effective vacuum will be applied for drawing in a rich priming charge from nozzle 30, the sudden increase in vacuum upon the engine 10 firing causing the initial partial opening of passage 82 whereby heated air will commence to be drawn therethrough. With continued running of engine 10, the air drawn through casing 74 and over thermostatic spring 78 therein will cause continued expansion of said thermostat thus causing a gradual and continued opening of choke valve 70 and a gradual and continued decrease of vacuum applied to the top of piston 55 whereby spring 90 gradually closes throttle 22 until the proper optimum engine operating temperature is reached when throttle 22 will be at its normal slow idling position. At such time idling mixture will be drawn solely through port 43.

During all idling periods when throttle 22 is closed, the idling vacuum will be applied through the small orifice 39 to the top of valve 35 thus raising the same from its seat in passage 28 against the resistance of spring 37, but this raising of valve 35 does not become fully effective until choke valve 70 is at least partially open whereby sufficient difference in pressure will exist between the upper and lower sides of the head of valve 35 to raise the same.

Also such idling vacuums are applied through the small port 65 to be applied to tube 62 whereby liquid fuel is raised therein to a predetermined height below the level of spindle 46, said height being determined by the size of the air bleed passage 88, the highest position of the liquid column in tube 62 being when throttle 22 is closed for idling speeds.

Now upon opening throttle 22 to any degree for increased speed of engine 10 (valve 70 being open), the vacuum on the engine side of throttle 22 will decrease while the vacuum in mixing chamber 21 will increase to the end that no mixture will be drawn through orifice 43 but mixture will be drawn in the proper amount and proportion from nozzle 30, the volume being governed by the degree of engine suction, applied and intensified through the action of the venturis 31 and 33, and the proportion of air to liquid fuel being controlled in the initial opening stage of throttle 22 by the action of valve 35.

Valve 35 is arranged to be seated in passage 28 and cut off the supply of air therethrough when throttle 22 is about one quarter open except for a very small amount which may pass through a calibrated orifice 34a therein. This supply of secondary air mixing in fitting 27 through a plurality of ports 27a gives fine atomizing effects on the liquid fuel supplied through passage 26 and also regulates the effect of the suction applied through nozzle 30 so that proper and economical proportions are maintained in the mixture at all operating speeds and loads other than idling.

The passage of air from passage 16 through port 34 and passage 28 to the secondary mixing chamber 29 will be better understood when it is explained that passage 16 is normally of greater diameter than mixing chamber 21. Also any vacuum induced at the throat of venturi 31 will be greater than the vacuum in passage 16 at any engine speed, therefore there will always be a circulation of air from passage 16 through port 34 and passage 28 to the nozzle 30. An equivalent effect for air bleeding nozzle 30 may be obtained by closing the port 34 to passage 16 and transferring the position of the same to a wall of cylinder 36 where it will open to air on the lower side of the head of valve 35, but the present and described location of port 34 is preferred because at starting periods there will be no flow of air from passage 16, thus leaving the rich priming charge from nozzle 30 undiluted.

The discharge of liquid fuel from accelerating well 61 occurs at the continued opening of throttle 22 but is particularly effective upon the sudden opening of throttle 22 from closed to open position. When this occurs, the vacuum at port 65 will drop from say 22 inches of mercury at idling to one half inch of mercury at wide open throttle. This causes the column of liquid fuel held in tube 62 to fall and fill the annular space 66 above the level of the passage 68 a predetermined distance so that the excess above that level will discharge through orifice 69 to there mix with the air stream now passing at high velocity through venturi 31. In this manner the inertia of the liquid fuel supplied through passage 26 is compensated for momentarily.

During normal running there may be insufficient difference in vacuum on either side of choke valve 70 to cause a diversion of sufficient heated air around thermostat 78 and for this reason standpipe 87 is provided with one edge cut away at 86 to receive the impact of the air stream, thus forcing the heated air through casing 74 to act on thermostat 78 and hold valve 70 open, the limit of opening being its horizontal position when one side thereof rests on the top of pipe 87.

At low temperatures and after starting as described, if it be desired to accelerate, increased richness of mixture is provided for because of the partially closed position of choke valve 70 thus throwing abnormal suction on nozzle 30 until engine 10 approaches optimum temperature conditions when valve 70 will be further opened and the abnormal suction on nozzle reduced.

With certain types of engines, the priming charge induced through nozzle 30 as already described is insufficient for the quickest and most desirable start and therefore, in addition to the choking means already described, further priming means are provided more particularly illustrated in Figs. 8 and 9. In Fig. 8, a lever 94 is fastened to spindle 71 at one end, the other end supporting a valve 95 adapted to be resiliently seated in passage 88 by the pressure of a spring 96, this being in order that choke valve 70 may be fully closed as well as valve 95. When this happens at starting periods, atmosphere is cut off from passage 88 by valve 95 to the end that a high cranking vacuum is applied to through orifice 65 and a stream of liquid fuel is drawn therethrough from tube 62. This additional stream of fuel aids the quick starting of engine 10 and after starting valve 95 still is held closing passage 88 because of a certain amount of lost motion between the end of lever 94 and the head of valve 95.

Thus additional fuel is supplied for starting and for running for a limited time thereafter until the continued opening of choke valve 70 causes lever 94 to engage the head of valve 95 and start to open passage 88. This action reduces the amount of fuel drawn through orifice 65 because air is now being admitted to passage 88 until passage 88 is wide open at optimum operating temperatures.

Another function of valve 95 is to be noted. While fuel is being drawn through orifice 65, as described, the liquid level in tube 62 will be raised above normal so that when throttle 22 is suddenly opened at subnormal operating temperatures, an additional amount of accelerating charge will be supplied from well 61 to orifice 69.

An alternative construction is shown in Fig. 9, wherein a thermostatic spring encircles valve 95, being held in spaced relation to the head thereof by a nut 98. Thermostat 97 is responsive to the heated air surrounding engine 10, more particularly when the same is placed under the hood of an automobile, and operates to open valve 95 with increasing temperatures of engine 10.

A modification of dashpot 54 is shown in Fig. 4, wherein choke valve 70 is placed in the center of passage 16 and holes 59 extend up to the head of stem 56. A starting, therefore valve 70 will be tightly closed and the engine suction will raise piston 55 and lever 52 a predetermined distance until certain of the holes 59 will be exposed to atmosphere thereby breaking the vacuum applied through stem 56 to the upper part of piston 55 until equilibrium is reached.

The air thus supplied through stem 56 to passage 16 takes the place of that supplied by the sudden jump of valve 70 when the same is placed off center and, as valve 70 now gradually opens with increasing temperatures, piston 55 will gradually fall and cut off more of the holes 59 until all are cut off from atmosphere at optimum operating temperatures.

Fig. 7 shows an alternative construction for the upper part of Fig. 5 wherein throttle arm 48 is firmly fastened to spindle 46 and spindle 46 supports lever 52 on the same side as arm 48. The tension of spring 92 is now so calibrated as to permit the limited opening of throttle 22 at starting as already described for fast idling and this construction permits the easy installation of apparatus shown in Fig. 8, if so desired.

Fig. 13 shows a modification of Figs. 5 and 7 wherein a lever 99 is fixed to spindle 71 and connected by a link 100 to a lever 101 fastened centrally to spindle 46. Link 100 has a head 102 sliding through a slot 103 in lever 101 and held therein by a pin 104 which is adapted to hold on lever 101 at starting periods for opening throttle 22 a predetermined amount against the resistance of a spring 105, said spring holding throttle 22 closed at idling position at optimum operating temperatures.

When choke valve 70 is closed, the action of thermostat 78 will cause link 100 to pull on lever 101 to hold throttle 22 open a certain distance for fast idling, thereafter as the temperature of engine 10 increases, valve 70 will gradually open and permit throttle 22 to gradually close. At any time throttle 22 may be fully opened, irrespective of the position of valve 70 because link 100 can freely slide through slot 103.

Fig. 16 shows a modification of Figs. 15 and 14, wherein the stove 14 is connected by a comparatively small pipe 15 to the interior of casing 74 thence to the manifold 11 on the engine side of throttle 22. This construction is provided in such cases as when the carbureter 13 is not supplied with hot air when passages 82 and 84 are plugged and heated air is drawn over thermostat 78 through pipe 15. The entry of pipe 15 to manifold 11 is through a small orifice about the size of a #70 drill when pipe 15 is one quarter inch internal diameter, but these comparative sizes may be varied with the capacity of engine 10 so as not to affect the idling mixture.

Figs. 17 and 18 show an alternative construction for Figs. 14, 15 and 16 wherein the heated exhaust gases are conveyed by their pressure from the interior of pipe 12 through pipe 15 to the interior of casing 74 wherein they heat thermostat 78 and pass to atmosphere through a plurality of holes 108, the entry of pipe 15 in exhaust pipe 12 facing in the direction of the flow of exhaust gases therethrough.

The entry of pipe 15 to casing 74 is controlled by a sector 106, fastened to spindle 71, having a tapered slot 107 therethrough to the end that pipe 15 may be fully opened to casing 74 at idling speeds and thereafter will be gradually reduced in opening at higher speeds when the exhaust gases are at a higher temperature. This action prevents excessive strains being applied to thermostat 78, due to excessive heat at high speeds.

By the various dispositions and constructions shown and described, it will be seen that a very rich mixture will be drawn into engine 10 initially by its suction, both by priming and choking, suddenly reduced to a rich mixture after firing and thereafter gradually reduced to normal as engine 10 arrives at normal and optimum operating temperature. The additional priming charge for starting is provided through orifice 65, which may vary in size for automobile engines from a #70 to a #60 drill hole, while the choking means cause a restriction in the supply of air as well as increasing the flow of fuel from nozzle 30. In the present case it will be seen that the additional priming supply may be dependent on the action of the choking means.

For any particular engine 10, the tension of spiral thermostatic spring 78 may be adjusted by loosening screw 79 and turning casing 74 until choke valve 70 is in the proper position when screw 79 is again made tight.

I claim:—

1. In a carbureter for supplying a mixture of air and fuel to a connected internal combustion engine, a throttle for controlling the mixture and suction operated means and means controlled thereby for partially opening the throttle when starting the engine.

2. In a carbureter for supplying a mixture of air and fuel to a connected internal combustion engine, a throttle for controlling the mixture and means actuated by the engine suction and means controlled thereby for controlling the initial opening of the throttle when starting the engine.

3. In a suction operated carbureter, a main air passage having a throttle therein, a discharge passage having a throttle therein, a fuel supply passage discharging between said throttles and means connected between said throttles and effected by engine suction for automatically opening the discharge throttle.

4. In a suction operated carbureter, a main air passage having a throttle therein, a discharge passage having a throttle therein, a fuel supply passage discharging between said throttles and suction operated means connected between said throttles and means controlled thereby for automatically opening the discharge throttle.

5. In a carbureter for supplying a mixture of air and fuel to a connected engine by its suction, a discharge throttle normally set to supply a minimum volume of said mixture to the engine when idling, and suction operated means and means controlled thereby to open said throttle to automatically increase the volume of said mixture when starting the engine.

6. In a carbureter for supplying a mixture of air and fuel to a connected engine by its suction, a discharge throttle normally set to supply a minimum volume of said mixture to the engine when idling, and suction operated means and means controlled thereby to open said throttle to automatically and temporarily increase the volume of said mixture when starting the engine.

7. In a carbureter for supplying a mixture of air and fuel to a connected engine by its suction, a discharge throttle normally set to supply a minimum volume of said mixture to the engine when idling, and suction operated means and means controlled thereby to open said throttle to automatically increase the volume of said mixture as well as the proportion of fuel to air therein when starting the engine.

8. In a carbureter, an air entry passage, a choking throttle in the air passage, a mixing chamber, a discharge throttle governing the discharge from the mixing chamber, a fuel nozzle discharging into the mixing chamber, and means dependent on the closing of the choking throttle and effected by engine suction for opening the discharge throttle.

9. The combination of an internal combustion engine having a passage for supplying fuel and air thereto, means to supply fuel and air to the passage, a throttle in said passage governing the supply of said mixture, and suction operated means actuated by engine suction and means acted upon by engine temperature to effect said suction means for varying the position of said throttle.

10. The combination of an internal combustion engine, a carbureter, a passage through the carbureter for supplying the engine with a mixture of fuel and air by engine vacuum, a nozzle discharging into said passage, means to supply fuel to the nozzle, a throttle in the passage posterior to the nozzle, an anterior throttle in the passage, and means associated respectively with said posterior and anterior throttles and dependent on the vacuum between said throttles for varying the position of both throttles.

11. The combination of an internal combustion engine, a carbureter, a passage through the carbureter for supplying the engine with a mixture of fuel and air by engine vacuum, a nozzle discharging into said passage, means to supply fuel to the nozzle, a throttle in the passage posterior to the nozzle, an anterior throttle in the passage, and means associated respectively with said posterior and anterior throttles and dependent on the vacuum between said throttles and on engine temperature for varying the position of both throttles.

12. The method of regulating the supply of fuel and air to an internal combustion engine which comprises supplying a very rich mixture of comparatively large volume to the engine by its vacuum at starting, firing the mixture whereby a sudden increase in vacuum occurs, then utilizing the sudden increase in vacuum to suddenly decrease the richness of the mixture and thereafter gradually decreasing the volume supplied while decreasing the proportion of fuel to air according to engine suction.

13. The method of regulating the supply of fuel and air to an internal combustion engine which comprises supplying a very rich mixture of comparatively large volume to the engine by its vacuum at starting, firing the mixture whereby a sudden increase in vacuum occurs, utilizing the sudden increase in vacuum to initially decrease the richness of the mixture and thereafter utilizing the engine temperature to gradually decrease the volume supplied and to further decrease the richness of the mixture while decreasing the proportion of fuel to air.

14. The method of regulating the supply of fuel and air to an internal combustion engine which comprises supplying a mixture of fuel and air to the engine in comparatively large volume, the proportion of fuel to air being comparatively high, then gradually reducing the volume supplied while reducing the proportion of fuel to air according to the engine suction.

15. The method of regulating the supply of fuel and air to an internal combustion engine which comprises supplying a mixture of fuel and air to the engine in comparatively large volume, the proportion of fuel to air being comparatively high, then gradually reducing the volume supplied while reducing the proportion of fuel to air according to the engine temperature.

16. The method of regulating the supply of fuel and air to an internal combustion engine which comprises supplying a mixture of fuel and air to the engine in comparatively large volume, the proportion of fuel to air being comparatively high, then gradually reducing the volume supplied while reducing the proportion of fuel to air according to the engine suction and temperature.

17. A carbureter having a constant level fuel supply chamber, a mixing chamber, means to supply air to the mixing chamber, a throttle governing the discharge from the mixing chamber, a well fed with liquid fuel from the supply chamber and discharging into the mixing chamber, means connected with the mixing chamber on one side of said throttle to raise the liquid level in the well above the constant liquid level in the chamber, and means to automatically vary the liquid level in the well depending on temperature.

18. A carbureter having a constant level fuel supply chamber, a mixing chamber, means to supply air to the mixing chamber, a throttle governing the discharge from the mixing chamber, a well fed with liquid fuel from the supply chamber and discharging into the mixing chamber, means connecting with the mixing chamber on one side of said throttle to raise the liquid level in the well above the constant liquid level in the chamber, and means to automatically vary the liquid level in the well and discharge the liquid fuel therein to the mixing chamber on either side of said throttle.

Signed at Los Angeles, in the county of Los Angeles and State of California, this 29 day of August, A. D. 1927.

CHARLES LAWRENCE STOKES.